March 27, 1973     J. P. CLAY ET AL     3,723,231

INSULATION MATERIAL

Original Filed Sept. 27, 1967

INVENTORS
JOHN P. CLAY
VERNON L. LINTVEDT

BY *Neil F. Martin*

ATTORNEY

United States Patent Office 3,723,231
Patented Mar. 27, 1973

3,723,231
INSULATION MATERIAL
John P. Clay, San Diego, and Vernon L. Lintvedt, La Mesa, Calif., assignors to General Dynamics Corporation, San Diego, Calif.
Continuation of abandoned application Ser. No. 670,889, Sept. 27, 1967. This application Oct. 1, 1970, Ser. No. 77,325
Int. Cl. C04b 43/00
U.S. Cl. 161—53           2 Claims

ABSTRACT OF THE DISCLOSURE

An insulation material comprising a thermal heat reflecting material such as aluminized polyester film, viz, Mylar, provided with a multiplicity of fiber tufts of flocking material spaced apart and bonded to the Mylar in a substantially polka-dot pattern. The upstanding fiber bristles serve to space the reflecting material away from adjacent structure or other adjacent layers of insulation. Heat transfer by conduction is reduced to a minimum as a result of the tufts of bristles being in point contact only with adjacent material and structure.

---

This application is a continuation of copending application Ser. No. 670,889, filed Sept. 27, 1967 and which is now abandoned.

The progress being made in the development of advanced missile and space vehicles has created an increasing need for a superior insulation material. For example, fuel tanks containing such cryogenic propellants as liquid hydrogen must be adequately insulated and shielded from external heat sources such as the sun. The fuel losses incurred through inadequate insulation are significant to the extent that considerable emphasis is being given by insulation and space vehicle manufacturers to the development of new improved insulating materials and/or improvement of those materials presently available.

Insulations suitable for use in insulating spacecraft and missile fuel containers must be fabricated from light weight materials in order to add as little weight as possible to the total vehicle weight. One of these light weight insulating materials presently in use comprises a thin gauge wrinkled foil having reflective coated surfaces. In use, the foil is wrapped in multiple layers about the outer wall surface of the tank. The wrinkles serve as multiple standoff means to space the remaining body of foil from adjacent structure.

A close inspection of the individual wrinkles of the foil discloses the apexes thereof to be slightly rounded. Upon being installed as the outer insulation wrapping of a fuel tank, for example, the wrinkles may be crushed or slightly flattened, whereby the areas of the wrinkles in intimate contact with the tank wall are considerably increased. Accordingly, the effectiveness of the insulation in preventing heat transfer to and from the tank wall is proportionately reduced.

Accordingly, it is an object of this invention to provide an insulation material embodying integral means to space the thermal reflecting surface thereof away from, and completely segregated from, contact with adjacent insulation strata or adjacent structure.

Another object of this invention is to provide an insulation material having integral spacing means whereby heat transmission by conduction is reduced to a minimum.

A further object of this invention resides in the provision of a spacing means having extremely low properties of heat conduction.

A still further object of this invention is to provide an insulation material having a high strength to weight ratio.

Other objects and advantages of this invention will further become apparent hereinafter in the drawings, in which.

The insulation material of the present invention is generally comprised of a thermal reflecting material having means integral therewith for spacing the reflective sheet of material from adjacent strata of insulation or other adjacent structure. The thermal reflecting material is preferably a thin polyester film, viz, Mylar, having one or both surfaces thereof treated with a reflective coating. Exemplary of a suitable coating is a vacuum deposited bright metal such as aluminum.

The spacing means is preferably extended from one surface only of the reflective sheet. Tufts of synthetic or natural fibers of flocking material are bonded to the reflective sheet in a substantially polka-dot pattern. The individual fibers of each tuft are arranged in a manner such that each fiber stands on end similar to the bristles of a brush. Spacing of the reflective sheet of insulation material from adjacent insulation strata or adjacent structure is effected through tip contact of the outstanding fiber bristles therewith.

Due to its inherent high strength to weight properties, the present insulation material is ideally suitable for use in many fields, such as missile and spacecraft where weight is a factor of prime concern. In such applications, the insulation material is wrapped or stratified around the structure to be insulated, with the bristles thereof directed inwardly toward the structure. In other fields, such as building and residence construction, strata of insulation may be placed loosely between ceiling joists or secured to roof rafters and wall studs. If desired, strata of insulation material may be enclosed in an envelope or the like of standard width dimensions to conform to the dimensions between rafters and studs for convenience in handling and installation.

Having reference now to the drawings, the insulation material generally designated by the numeral 10 is a thin sheet of flexible material 12 preferably of polyester film such as Mylar having a preferred thickness of approximately ¼ mil. One or both surfaces of the material 12 is treated with a reflective coating. This reflecting coating may be vacuum deposited aluminum or any one of several bright mirror-like coatings or platings, such as chromium, nickel, silver, etc.

Spacing means 14 is bonded to surface 18 of the material 12. Surface 18 may or may not be treated with a reflective surface coating. Where the material 12 is surface coated on one surface only, the spacing means is bonded to the untreated or non-reflective surface. The reason for this will become apparent from the description as later follows.

Figure 1:
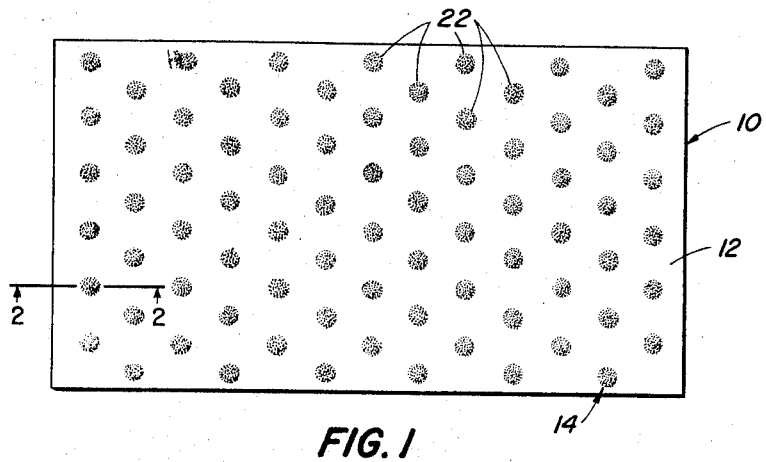
FIG. 1 is a plan view of the insulation material of the present invention.
Figure 2:
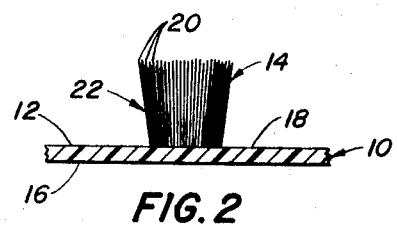
FIG. 2 is an enlarged fragmentary cross sectional view taken along the line 2—2 of FIG. 1.

The spacing means 14 comprises a multiplicity of synthetic or natural strands of fibers 20 bonded in tufts 22 to the surface 18 of the material 12. The fibers 20 are hair-like bristles projecting perpendicular from the surface 18 which serve to space the material 12 away from adjacent structure. The desired pattern or arrangement of the individual tufts 22 on the material 12 is as shown in FIG. 1. Although other patterns have been found to be satisfactory, the polka dot or staggered pattern is deemed to be ideally suitable due to the uniformity of support afforded thereby by the equal spacing of the tufts 22 from one another in all directions. Exemplary of dimensions suitable for use in many applications of insulations are: tuft spacing center-to-center, approximately three-eights inch; tuft diameter at base or juncture with material 12, approximately one-sixteenth inch; length of individual fibers varying between thirty thousandths inch (.030) to fifteen hundredths inch (.15); and fiber thickness varying between one thousandth inch (.001) and ten thousandths inch (.010).

In the manufacture of the insulation material 10, a reflective-coated sheet material 12 is studed with dots of adhesive by any one of several printing processes, i.e., silk screening. Immediately following the application of the dots of adhesive, material 12 is oscillated at a predetermined frequency while flocking material or fibers 20 are distributed across the surface thereof. The vibratory or oscillatory motion imparted to the material 12 causes the loose fibers 20 to orient themselves in a plane perpendicular to the plane of the material whereupon they are embedded into the dots of adhesive in an upstanding position.

Exemplary of a means suitable to vibrate the material 12 is the beater process. In this process a pair of flat-sided rollers having parallel axes suitably spaced from one another are rotated as the material 12 is being passed thereover while under slight tension. Thus the material 12 is oscillated in a rapid up and down motion as the corners of the flat-sided rollers intermittently strike the under surface 16 thereof. Subsequently, the material is placed on racks to allow for drying of the adhesive. Excess flocking material may thereafter be removed in any convenient manner such as by air blower or the like.

Figure 3:
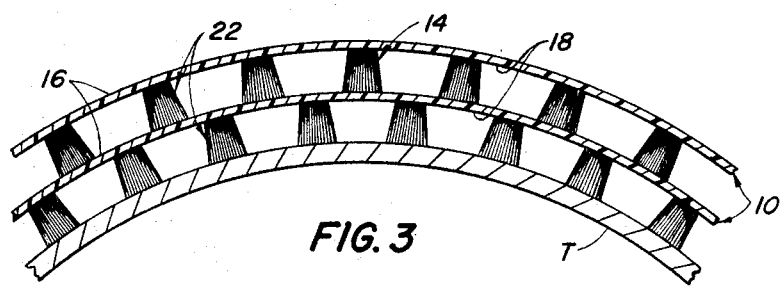
FIG. 3 is a fragmentary cross sectional view illustrating a multiple layer arrangement of insulation material applied to the wall of a tank or container.

FIG. 3 illustrates the application of multiple layers or wrappings of insulation material 10 about the external wall surface of a tank or container T. It will be apparent that the tufts 22 serve to space the reflective material 12 of the insulation material 10 from the reflective material 12 of the adjacent material 10 in addition to spacing the reflective material 12 from the tank T.

As hereinbefore discussed, the reflective coating of the material 12 may sometimes be applied on the surface 16 only. In the application of insulation 10 to the tank T, it is desirable to insulate the tank T from direct exposure to the sun's rays. Consequently, the reflective coating of the material 12 need only be applied to the outer surface 16 thereof to reflect the heat radiating from the sun.

In other applications such as may be used in home construction, it is desirable to coat both surfaces 16 and 18 with the thermally reflective coating. Thus in cold weather, heat radiating from within the home is continually being reflected back into the rooms. Similarly, outside heat during hot weather is continually being reflected back to atmosphere.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. A multi-layer thermal insulation structure comprising:

a plurality of insulation sheets, each of said sheets comprising flexible, plastic film material, said sheets having a thin reflective layer on at least one surface thereof, a plurality of substantially uniformly spaced discrete groups of fibers adhesively bonded to a first surface of said sheets, said fibers being oriented substantially perpendicular to said first surface of said sheets, and said sheets arranged in a stacked relationship, with the free ends of said fiber groups of one sheet in unbonded point contact with the second surface of an adjacent sheet.

2. The multi-layer thermal insulation structure according to claim 1 wherein the reflective layer of each of said sheets is on the surface opposite the surface to which said fibers are bonded, said stack arranged with the fiber bearing surface facing towards the object to be insulated from thermal radiation.

References Cited

UNITED STATES PATENTS

| | | | |
|---|---|---|---|
| 3,502,207 | 3/1970 | Alexander | 161—64 X |
| 3,099,514 | 7/1963 | Haber | 117—25 X |
| 3,589,975 | 6/1971 | Andrews et al. | 161—216 |
| 2,900,270 | 8/1959 | Klein | 117—25 |
| 2,901,373 | 8/1959 | Weiss | 117—25 X |
| 3,009,601 | 11/1961 | Matsch | 220—9 |
| 3,067,569 | 12/1962 | Kelley | 161—216 X |
| 3,152,033 | 10/1964 | Black et al. | 161—50 |
| 3,328,218 | 6/1967 | Noyes | 161—53 X |

GEORGE F. LESMES, Primary Examiner

M. E. McCAMISH, Assistant Examiner

U.S. Cl. X.R.

117—17.5; 156—72, 276, 279, 280; 161—63, 64, 67, 69, 122; 220—9 A